Patented May 30, 1939

2,160,442

UNITED STATES PATENT OFFICE 2,160,442

MOLDED ARTIFICIAL FUEL

Gaston Oscar Frédéric Piou de Saint-Gilles and Jean Guillaume Yves Saget, Paris, France No Drawing. Application May 4, 1937, Serial No. 140,732. In France May 4, 1936

3 Claims. (Cl. 44—17)

This invention relates to a method for the manufacture of an improved fuel especially adapted for use in gas producers from mineral, vegetable or animal combustible carbonaceous materials, and more particularly from a mixture of wood paste and powdered coal.

It is a primary object of this invention to manufacture from such materials small briquets having an increased content of lower hydrocarbons, particularly suitable for use in gas producers by increasing the proportion of light hydrocarbons, that is to say lower hydrocarbons, not through a hydrogenation of the carbon but chiefly through oxidation of the hydrocarbons and the ternary compounds of carbon, hydrogen and oxygen; such oxidation amounts to conversion of the hydrocarbons into other hydrocarbons having a less number of carbon as well as hydrogen atoms.

The essential feature of the present invention is the following: From raw materials taken in the divided state and substances capable of producing, when heated, oxygen or oxidizing bodies, we form molded products, possibly with the addition of agglutinant materials. Then we subject these molded products to a heat treatment of relatively short duration (averaging half an hour or three quarters of an hour) at a temperature at least equal to the temperature (about 650–700° C.) at which water begins to be dissociated into its elements, after which the molded products, in which light hydrocarbons and fixed carbon have accumulated, are ready to be used in gas producers.

It is especially advisable to perform the heat treatment at a temperature ranging from 650 to 800° C.

The heat treatment or baking of the products preferably takes place in an oxidizing atmosphere, which permits of starting a partial combustion and thus considerably reducing the amount of heat to be supplied externally. Once this partial combustion has been started, the reaction is allowed to proceed in a closed vessel, with a slight addition of oxygen; then the process is finished by leaving the reactions to end in a confined space for a time of twenty to thirty minutes; the former part of said heat treatment has taken about ten minutes.

In order to reach full efficiency in the heat treatment effected as above explained, it is advantageous to choose a suitable interrelation between the surface and the volume of the products prepared by molding. The choice of a correct proportion also ensures an advantage when these products are utilized in a gas producer. Preferably, the products are given approximately the size of marbles or ordinary lozenges or troches.

The process according to the present invention may include the following features:

(1) Disintegration of combustible materials, and especially wood in such manner that they lose their initial condition and are reduced into small bits through means which may be either chemical means or physico-chemical means (dissolution with or without reactions) or again purely physical means, such as depulping, defibering, crushing, and so on.

(2) Adding to the resultant disintegrated materials additional ingredients of binding character including substances adapted to generate an oxidizing gas at a raised temperature, the precise nature of which is to be hereinafter disclosed, in the form of powder or as liquid or pasty solutions.

(3) Suitable molding of the mixtures under predetermined conditions of temperature and pressure.

(4) Baking the molded products in a closed vessel by applying external heat to start exothermic reactions within the mass of molded products; the supply of external heat is however restricted to the minimum amount necessary for producing such reactions; otherwise the whole amount of volatile materials included in the products would be freed therefrom as easily condensable gases or vapours, while by suitably restricting the amount of external heat, a part of said volatile materials remains confined within the baked molded products.

The additional ingredients may include binders capable of undergoing chemical conversion during heat treatment such as pitch and tars, as will be hereinafter disclosed in an example, but always a substance of an oxidizing nature, i. e. which is capable of generating an oxidizing gas to convert higher hydrocarbons into lower hydrocarbons as will be hereinafter explained.

According as the case may be, the heat treatment of the products may take place:

(1) Either in a confined space, in a reducing or neutral atmosphere; the gases or vapours produced may be collected in order to utilize them as a complementary source of heat for baking;

(2) Or by producing a partial combustion at the surface of the molded products in an oxidizing atmosphere, for instance in air;

(3) Or again by successively applying these two processes.

It should be understood that, in actual practice, the optimum duration of heat treatment and the optimum temperatures at which said treatment is performed will vary in accordance with the particular nature of the starting materials and the amount of additional ingredients; however their order of magnitude is apparent from the example to be hereinafter given.

For carrying out the process, the starting materials, previously reduced into a powdery or pasty state, are mixed with a substance capable, by subsequent reaction, of producing in the molded mass a disengagement of oxidizing gas. This substance is for instance ammonium nitrate $NO_3NH_4$ which melts at a temperature of 150° C. and is split at a temperature of 250° C., into water and nitrogen protoxide. We might also make use of sodium nitrate, potassium permanganate, and so on.

By way of example, we consider a mixture containing: 40 per cent of a wood paste manufactured in known manner and including dextrines, 40 per cent of powdered soft coal; 10 per cent of ammonium nitrate; 10 per cent of a mixture of pitch and tars.

The molded products are introduced into a vessel heated at a temperature of 650–700° C. in an oxidizing atmosphere, for instance in the presence of air. A rapid disengagement of combustible gas takes place, producing, as a result of the combustion of said gas, a partial cracking in the periphery of the molded products. Once this combustion has been started, the vessel is closed, the combustion reactions in a slightly oxidizing atmosphere (moderate introduction of air) being pursued for about ten minutes, during which period the central mass reaches the temperature necessary for decomposition of ammonium nitrate. The operation is conducted in such manner as to supply, through the combustion of the first gases and the addition of heat from the outside, the calories necessary on the one hand to produce the desired rise of temperature in the mass and on the other hand to compensate for calories lost in the course of endothermic reactions. The treatment is finished without supply of extraneous heat after a period of reaction in the confined space of from twenty to thirty minutes.

The light hydrocarbons freed as a result of the quick distillation of superficial strata, also burn with production of heat and the reactions are so controlled that said heat together with the extraneous heat be sufficient to bring the whole mass to the desired temperature and to compensate for heat expenses caused by endothermic reactions.

The aromatic hydrocarbons from benzene, that is to say $C_7H_8$, $C_9H_{10}$, etc., the higher saturated hydrocarbons, the paraffins, the naphthalenes, the anthracenes, are more or less oxidized and give rise to reactions such for instance as the following one:

$$C_nH_{2n+2} + O \rightarrow H_2O + C_nH_{2n}$$

Now water at a temperature higher than 650° C. is in a state of dissociation and it gives off hydrogen and oxygen, the latter combining with the hydrocarbons. Said hydrocarbons are depolymerized, disengaging carbon according for instance to the following reaction:

$$C_nH_{2n} + O \rightarrow H_2O + C_{n-1}H_{2(n-1)} + C$$

These reactions constitute one of the characteristic features of the present invention.

Finally, we obtain, for each molded element:
(1) A recuperation of fixed carbon;
(2) An agglomeration, in the centre of the mass, of hydrocarbons which may be of a higher or lower degree, but which are such that, under the action of the nozzle of the gas producer, they distil into light hydrocarbons such as $C_2H_2$, $C_2H_4$, $C_4H_8$, $C_6H_6$, $C_7H_8$, giving a good result in the engine, carbon being in turn transformed into carbon monoxide.

Finally, there is a tendency for the production, in the gas producer, of "gasoline gas" as a consequence of the reduction of the proportion of heavy hydrocarbons by means of the oxygen and not by hydrogenation of the carbon.

In a general manner, while we have, in the above description, disclosed what we deem to be practical and efficient embodiments of the invention, it should be well understood that we do not wish to be limited thereto as there might be changes made therein without departing from the principle of the invention as comprehended within the scope of the appended claims.

What we claim is:

1. A method for the manufacture of an improved fuel, which comprises briquetting a mixture of ground coal and disintegrated wood with a minor proportion of ammonium nitrate, to form molded shapes; placing the molded shapes in an open zone heated to a temperature of about 650 to 700° C., to start evolution of combustible gas and incipient combustion of said gas; confining the heated zone to cut off the molded shapes from atmosphere, while still supplying to the shapes an amount of air insufficient to support complete combustion, for about ten minutes; then cutting off the air supply as well as the heating of the zone and leaving the molded shapes in said confined zone for a period of about twenty to thirty minutes.

2. A method for the manufacture of an improved fuel from divided solid natural materials mainly consisting of carbon with hydrocarbons retained therein which comprises briquetting the starting material with a minor amount of a substance adapted to generate an oxidizing gas at a raised temperature, so as to form molded shapes; exposing the molded shapes in a confined zone to a temperature ranging from about 650 to 800° C. for a time averaging half an hour to three quarters of an hour, after which the molded shapes are ready for use.

3. A method for the manufacture of an improved fuel, from divided solid natural materials mainly consisting of carbon with hydrocarbons retained therein, which comprises briquetting the starting material with a minor amount of a substance adapted to generate an oxidizing gas at a raised temperature, so as to form molded shapes; placing the molded shapes in an open zone heated at a temperature ranging from about 650 to 800° C., to start a partial combustion for a time of about ten minutes; confining the said zone to cut it off from atmosphere while stopping heating and maintaining the molded shapes in said nonheated confined zone for a time averaging twenty to thirty minutes, after which the molded shapes are ready for use.

GASTON OSCAR FRÉDÉRIC PIOU DE
SAINT-GILLES.
JEAN GUILLAUME YVES SAGET.